Sept. 15, 1959 D. W. ROSENTHAL ET AL 2,904,407
CHEMICAL REACTOR
Filed Nov. 1, 1956 2 Sheets-Sheet 1
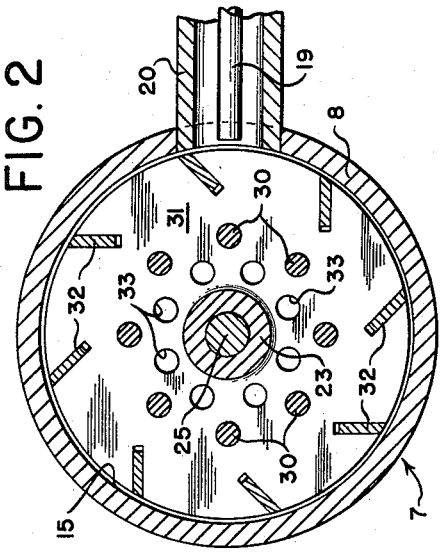
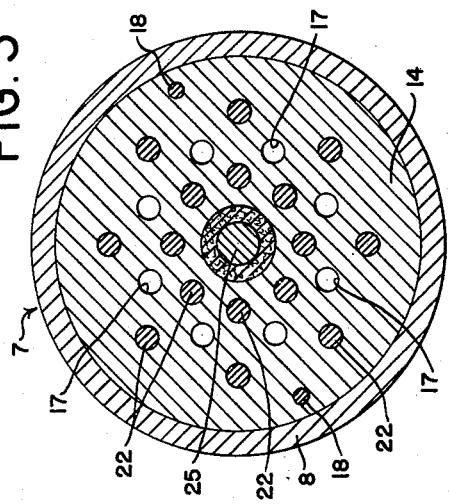
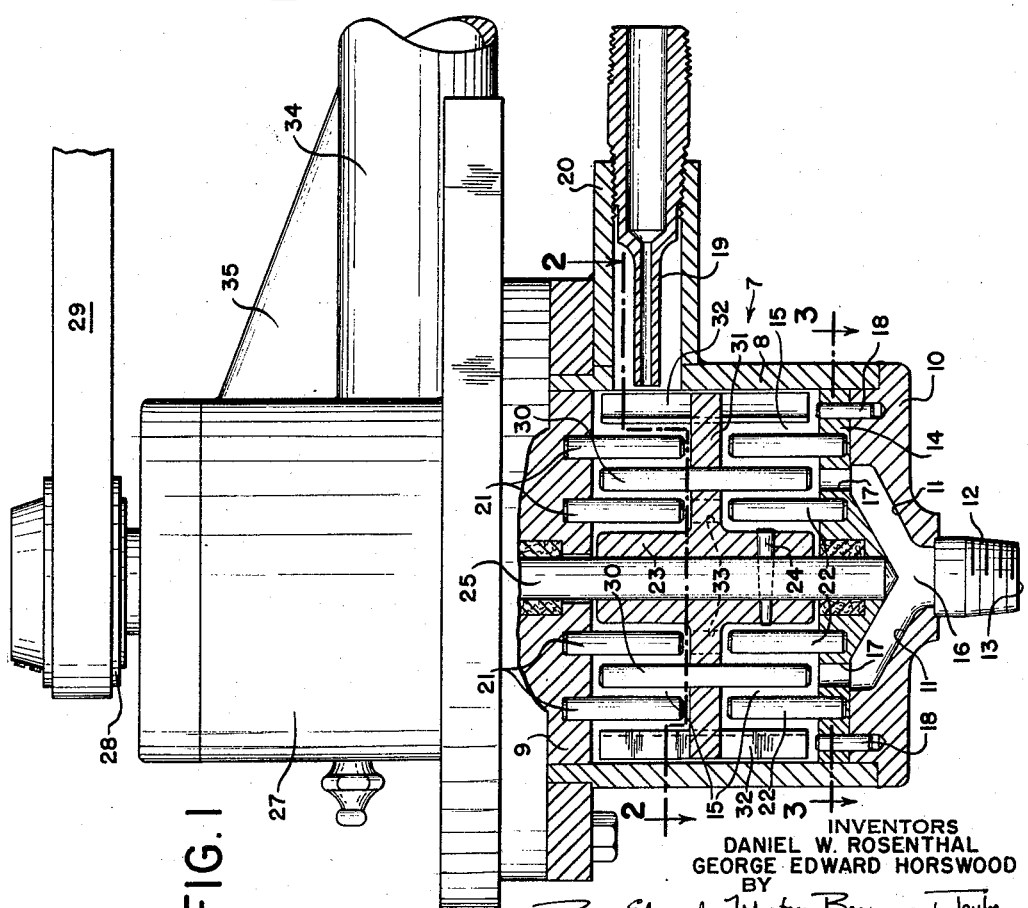
INVENTORS
DANIEL W. ROSENTHAL
GEORGE EDWARD HORSWOOD
BY
Pennie, Edmonds, Morton, Barrows & Taylor
ATTORNEYS Sept. 15, 1959     D. W. ROSENTHAL ET AL     2,904,407
CHEMICAL REACTOR
Filed Nov. 1, 1956     2 Sheets-Sheet 2
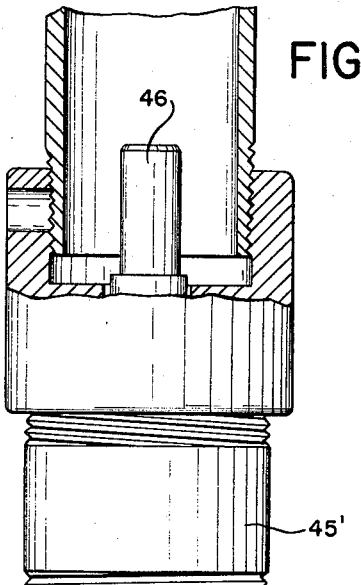
INVENTORS
DANIEL W. ROSENTHAL
GEORGE EDWARD HORSWOOD
BY
Pennie, Edmonds, Morton, Barrows & Taylor
ATTORNEYS

United States Patent Office 2,904,407
Patented Sept. 15, 1959

2,904,407
CHEMICAL REACTOR

Daniel W. Rosenthal, Lynbrook, N.Y., and George E. Horswood, Palmyra, N.J., assignors, by direct and mesne assignments, to Klauder Weldon Giles Machine Company, Philadelphia, Pa., a corporation of Delaware Application November 1, 1956, Serial No. 619,811

2 Claims. (Cl. 23—252)

This invention relates to chemical reactors and, more particularly, to a reactor adapted for continuously initiating a reaction which generates a foam-producing gas phase dispersed in a resin phase. The chemical reactor of the invention is particularly suited for use in producing low-density polyurethane foams.

The modification of polyesters with diisocyanates has been used extensively to prepare highly foamed solid resins. The foaming process is due primarily to the evolution in situ of carbon dioxide upon the reaction of an organic isocyanate together with a carboxylic group, while the urethane linkage is provided by the reaction of a hydroxy group with an organic isocyanate. Consequently, polyurethane foams are formed by reacting a diisocyanate with a polyester containing a large number of hydroxy groups and carboxylic groups, or by adding water to a polyester-diisocyanate reaction mixture.

In general, the foaming reaction is highly exothermic and generates an immediate increase in temperature and pressure soon after the reactants are brought together. Due to the highly exothermic nature of the reaction, foaming commences almost immediately after initiation of the reaction, and consequently imposes severe restrictions on the design of adequate processing machinery for mass production. A suitable reactor for initiating the polyurethane foam reaction must be able to discharge the reaction mixture prior to premature foaming and resin solidification in the reactor.

Initiation of the foaming reaction, without premature foaming and resin solidification, has been accomplished in a variety of specialized reactors. In one reactor, the diisocyanate and polyester are initially mixed together, and then reacted with water and activator in a second chamber. Since, however, the diisocyanate-polyester mixture is subject to gelling on exposure to atmospheric humidity, precautions must be taken in this reactor to prevent humid air vacuoles from forming during the final mixing, and gelling the foam in the reactor chamber.

Another reactor currently in use is based on spraying the components under high pressure into an autoclave chamber prior to discharge. Although excellent mixing is obtained, high pressure equipment is required and specially trained operators must be in constant attendance to prevent pressure leakage of the highly poisonous diisocyanate.

We have now developed a chemical reactor in which the reaction between a diisocyanate and a polyester may be initiated without danger of foaming or gelling in the reactor. This chemical reactor, which may be used to initiate any reaction which generates a foam-producing gas phase dispersed in a resin phase, comprises an enclosed reaction vessel and a driven rotor positioned within the reaction vessel. Both the reaction vessel and the rotor define a two-chamber structure, one chamber of which comprises a mixing chamber provided with at least one fluid reactant injection inlet, while the other chamber comprises a collecting chamber adjoining the mixing chamber. The collecting chamber is provided with collecting passages interconnecting the mixing chamber with a discharge orifice, and the rotor is provided with agitating means positioned within the mixing chamber of the reaction vessel.

When the reactor is to be affixed to a stationary mount, the reaction vessel may be provided with a partition plate to define the two-chamber structure, in which case the upper chamber is preferably the mixing chamber, while the lower, or adjoining, chamber constitutes the collecting chamber.

Alternatively, the partition plate may be rotatably mounted on the rotor and adapted to subdivide the reaction vessel into a two-chamber structure. Such an arrangement has been found to be especially practicable for a portable reactor, which may be temporarily installed and used at a variety of locations. In either case, however, the partition plate must be provided with collecting passages through which the mixing chamber and collecting chamber communicate.

Several specific embodiments of the invention have been illustrated in the accompanying drawings, in which Fig. 1 is a longitudinal elevation, partly in section, of a chemical reactor of the invention, showing a reactor attached to a fixed mount;

Fig. 2 is a section along line 2—2 of Fig. 1;

Fig. 3 is a section along line 3—3 of Fig. 1;

Fig. 4 is a longitudinal elevation, partly in section, of a portable reactor according to the invention, illustrating the rotor positioned within the reaction vessel and defining a two-chamber structure;

Fig. 5 is a section along line 5—5 of Fig. 4; and

Fig. 6 is a section along line 6—6 of Fig. 4.

Referring to Fig. 1 of the drawings, the chemical reactor of this invention comprises an enclosed reaction vessel 7 constructed from a cylindrical tube 8 which is closed at the upper end by a top plate 9 and at the lower end by a bottom plate 10. A portion of the inner surface of the bottom plate 10 is hollowed into a conical cavity 11, the apex of which extends through a nozzle 12 and forms a discharge orifice 13 for the reaction vessel.

A partition plate 14, seated on the bottom plate 10, subdivides the reaction vessel into a two-chamber structure consisting of an upper mixing chamber 15 and an immediately adjoining lower collecting chamber 16. The partition plate 14 is provided with collecting passages 17, preferably eight in number, which are located over the collecting chamber 16. When the partition plate is securely locked in this position, as by two dowel pins 18, both the mixing chamber 15 and collecting chamber 16 are interconnected through the collecting passages 17.

The fluid reactants are introduced into the reactor vessel through an injection nozzle 19 opening into the mixing chamber 15. The injection nozzle 19 is securely threaded into a conduit port 20, which is welded to the cylindrical tube 8 of the reaction vessel and opens into the mixing chamber 15. Although the chemical reactor illustrated in Fig. 1 shows only one fluid reactant injection inlet, the reactor advantageously may have two such inlets opening into the mixing chamber. Such a reactor, fitted with two injection nozzles, has performed particularly satisfactorily in initiating a polyurethane foam reaction in which toluene diisocyanate and a polyester were separately introduced into the mixing chamber.

Agitation of the fluid reactants is aided by clusters of stationary agitator pins projecting into the mixing chamber 15. Embedded in the top plate 9, two concentric rows of stationary upper agitator pins 21, preferably sixteen in number, depend into the mixing chamber 15. For each upper agitator pin 21, a corresponding lower agitator pin 22, positioned in the partition plate 14, projects upwardly into the mixing chamber 15.

Operating in conjunction with the stationary agitator pins, a driven rotor 23 positioned within the mixing chamber 15 provides the vigorous agitation required to initiate the foam-producing reaction. The rotor 23 is secured by a cotter pin 24 to a rotatably-mounted shaft 25 which is axially positioned within the mixing chamber 15. The shaft 25 is journaled at its lower extremity in the partition plate 14 and extends through the the top plate 9. The uppermost portion of the shaft 25 is mounted on bearings within a bearing housing 27 and supports, at its protruding upper extremity, a pulley 28, which is driven by a V-belt 29. By coupling the V-belt 29 to a variable-speed motor, the angular velocity of the rotor 23 may be adapted to the requirements of the specific foam-generating reaction occurring in the reactor.

To obtain effective agitation of the reactants in the mixing chamber 15, the rotor 23 is provided with a circular row of eight agitator pins 30, as shown in Fig. 2, mounted on an agitator disk 31, which forms part of the midsection of the rotor 23. The agitator pins 30 pass perpendicularly through the agitator disk 31 and extend into the mixing chamber. In this position, the agitator pins 30 follow a path between the rows of stationary agitator pins 21, 22 and thus operatively mesh to create a condition of turbulence in the mixing chamber 15.

To prevent the reaction mixture from prematurely gelling on the walls of the reactor, the rotor 23 is advantageously provided with a series of scraper blades 32, preferably eight in number, which are mounted coaxially about the periphery of the agitator disk 31. These scraper blades 32 deflect any viscous material, having a tendency to adhere to the walls of the reaction vessel, back into the mixing chamber, and prevent accumulation of reactants along the walls of the reactor.

When a very viscous material is injected into the mixing chamber 15, the agitator disk 31 frequently prevents rapid drainage of the reactants into the collecting chamber 16. As indicated previously, retention of the reactants in the reactor for a substantial period of time tends to accelerate premature gelling of the reaction products in the apparatus. Avoidance of premature gelling is accomplished by providing the rotor 23 with drainage orifices 33, which increase the turbulence in the mixing chamber 15, and prevents too rapid an increase in viscosity. Consequently, the reaction mixture readily drains into the collecting chamber 16 and through the discharge orifice 13, as illustrated in Fig. 3.

The chemical reactor illustrated in Fig. 1 is welded to a fixed mount, preferably to a pipe 34 and gusset plate 35, since the rotor 23 is driven by a V-belt 29. By using a flexible cable drive in place of a V-belt drive, the reactor may be detached from the fixed mount and converted into a portable unit.

The chemical reactor illustrated in Fig. 4 is modified for use as a portable unit and is particularly suitable for continuously initiating a polyurethane foaming reaction. In this modified reactor, the reaction vessel 36 is formed from a length of tubing 37 externally threaded at both ends. One end of the tube 37 is in threaded engagement with a coupling 38 which defines the upper portion of the reaction vessel; the opposite end of the tube 37 is closed by an internally threaded conically shaped cap 39, which forms the lower portion of the reaction vessel. A nozzle 40 is coaxially positioned within the apex of the cap 39 and provides a discharge orifice 41 for the reaction vessel.

The upper portion of the reaction vessel is provided with two injection inlets 42 and 43 which separately channel fluid reactants through the coupling 38 into the reaction vessel. Each of these injection inlets is adapted to receive a threaded tube which may in turn be connected to a reactant storage tank.

Agitation of the fluid reactants is provided by a driven rotor 44 positioned within the reaction vessel. The rotor 44 comprises a rotatable shaft 45 which is axially positioned within the reaction vessel. The shaft 45 extends through the coupling 38 and through a bearing housing 45' coupled to the reaction vessel. The protruding upper end 46 of the rotatable shaft 45 may be attached to a flexible shaft drive leading into a variable speed motor.

A partition plate 47 is perpendicularly mounted on the base of the rotatable shaft 45 and subdivides the reaction vessel into a mixing chamber 48 and a collecting chamber 49. The partition plate 47 is provided with collecting passages 50, preferably eight in number, through which the mixing chamber 48 and the collecting chamber 49 communicate. That portion of the rotatable shaft 45 which extends into the mixing chamber 48 is provided with a force-fitted sleeve 51, on and about which agitator vanes 52 are mounted radially and extend into the mixing chamber 48.

Since the angular velocity of the rotor 44 is generally high, the lower edge of each of the agitator vanes 52 may be welded to the partition plate 47 for increased strength. Each of the agitator vanes is provided with a series of troughs 53 which are spatially staggered so that the flow of reactants through the mixing chamber 48 is channeled in a helical path. This arrangement of the agitator vanes 52, as shown in Figs. 4 and 6, provides turbulent agitation in the mixing chamber 48.

Both chemical reactors have been found to be eminently suited for continuous initiation of the polyurethane foaming reaction. The angular velocity of the rotor, as well as the hold-up time of the reactants in the mixing chamber, in general are dependent upon the particular formulation used in the foam-producing reaction. Using the chemical reactor of this invention, the polyurethane reaction may be initiated without danger of premature gelling in the reactor and without a significant increase in the pressure occurring in the mixing and collecting chambers.

We claim:

1. A chemical reactor adapted for continuously initiating a reaction which generates a foam-producing gas phase dispersed in a resin phase, said reactor comprising an enclosed reaction vessel and a driven rotor positioned therewithin, the rotor comprising a rotatable shaft positioned axially within the reaction vessel, a partition plate mounted perpendicularly on the base of the rotatable shaft and adapted to subdivide the reaction vessel into a mixing chamber and a collecting chamber, and agitating means positioned within the mixing chamber, the partition plate being provided with a plurality of collecting passages formed therein through which the mixing chamber and collecting chamber communicate, the reaction vessel being provided with at least one fluid reactant injection inlet opening into the mixing chamber and with a discharge orifice positioned within the collecting chamber.

2. A chemical reactor adapted for continuously initiating a reaction which generates a foam-producing gas phase dispersed in a resin phase, said reactor comprising an enclosed reaction vessel and a driven rotor positioned therewithin, the rotor comprising a rotatable shaft positioned axially within the reaction vessel, a partition plate mounted perpendicularly on the base of the rotatable shaft and adapted to subdivide the reaction vessel into a mixing chamber and a collecting chamber, and agitator vanes mounted radially on and about the rotator shaft and extending into the mixing chamber, the agitator vanes being provided with troughs adapted to channel the flow of reactants through the mixing chamber in a helical path, the partition plate being provided with a plurality of collecting passages formed therein through which the mixing chamber and collecting chamber communicate, the reaction vessel being provided with two fluid reactant injection inlets opening into the mixing chamber and with a discharge orifice positioned within the collecting chamber.

References Cited in the file of this patent

UNITED STATES PATENTS

| | | |
|---|---|---|
| 2,125,455 | McLean | Aug. 2, 1938 |
| 2,673,723 | Keen | Mar. 30, 1954 |
| 2,706,108 | Miner | Apr. 12, 1955 |
| 2,764,565 | Hoppe et al. | Sept. 25, 1956 |